(No Model.)

T. S. VAN DEVORT.
CABINET CREAMER.

No. 318,402. Patented May 19, 1885.

WITNESSES:
Phil C. Dieterich
T. W. Keyworth

INVENTOR
Thos. S. Van Devort
BY
J. A. Alexander
ATTORNEY

United States Patent Office.

THOMAS S. VAN DEVORT, OF SUPERIOR, MICHIGAN.

CABINET-CREAMER.

SPECIFICATION forming part of Letters Patent No. 318,402, dated May 19, 1885.

Application filed September 15, 1884. (No model.)

*To all whom it may concern:*

Be it known that I, THOMAS S. VAN DEVORT, of Superior, in the county of Washtenaw and State of Michigan, have invented certain new and useful Improvements in Cabinet-Creamers; and I do hereby declare that the following is a full, clear, and exact description thereof, reference being had to the accompanying drawings, and to the letters of reference marked thereon, which form part of this specification.

This invention relates to certain improvements in cabinet-creamers; and it has for its objects to provide for conveniently removing the cream after it has collected on the surface of the milk in the milk-vessels, to draw off the milk from said vessels and discharge the water from the ice-tanks surrounding the milk-vessels, and to provide an improved ice-tank with a maximum ice capacity and minimum water capacity, as more fully hereinafter specified. These objects I attain by the means illustrated in the accompanying drawings, in which—

Figure 1:
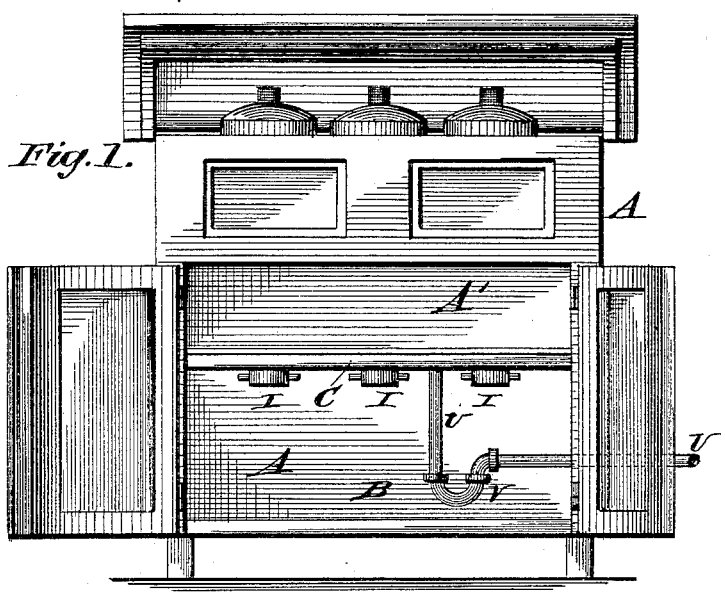
Figure 3:
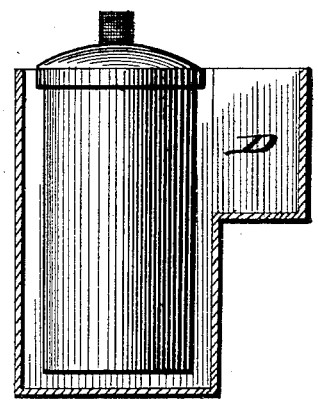
Figure 2:
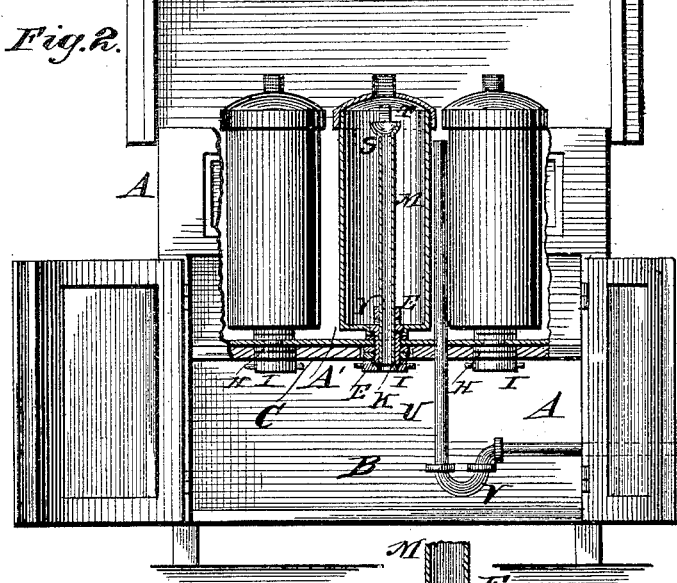
Figure 4:
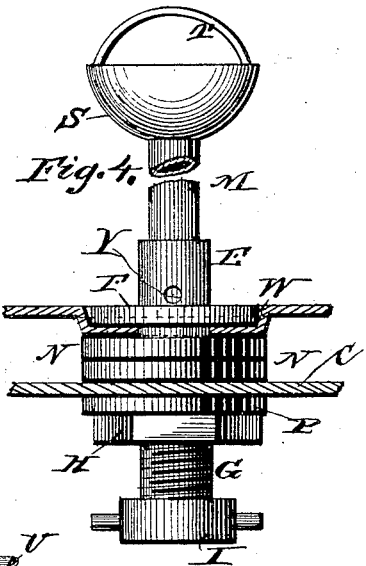

Figure 1 represents a front view of a creamer, showing the doors which close the lower refrigerating-chamber open. Fig. 2 represents a view partly in front elevation and partly in section, showing the construction and arrangement of the cans and their attachments. Fig. 3 represents a detached view of the water-tank and one of the cans; Fig. 4, a detached view of a tube which is secured to the bottom of the can and tank, and Fig. 5 a sectional view of the same.

The letter A indicates a rectangular or other shaped casing or cabinet, of wood, metal, or other suitable material, which may be constructed with double walls packed or otherwise arranged to economize ice. The said cabinet is divided into two compartments, A' B, by means of a horizontal partition, C, the upper compartment forming a tank for the ice and water resulting from the melting thereof. The said tank is formed with an ice-receptacle, D, at the rear, front, or one or both sides, as shown in Fig. 3 of the drawings. This gives the tank a maximum ice capacity with a minimum water capacity. When the cabinet is constructed of wood, a separate tank or metallic lining may be employed.

The letter E indicates a tube, which is provided with a flange, F, at a suitable distance below its upper end, for the purpose hereinafter described. The lower end is provided with an external screw-thread, G, and an internally-threaded jam-nut, H, which can be moved upon the thread; and at its lower end said tube is provided with a threaded stuffing-box, I, having an expansible packing or washer, K.

Figure 5:
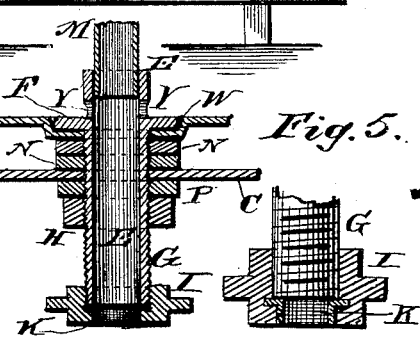

The letter M indicates a tube, which passes through the tube E and stuffing-box, as shown in Fig. 5 of the drawings. The said tube E is also provided on its outside with washers or packing-rings N P, for the purpose hereinafter described. The tube M has at its top a concavo-convex disk or skimming-cup, S, and a bail, T, by which it may be moved up and down through the tube E and stuffing-box, for the purpose of skimming off the cream or drawing off the milk, as more fully hereinafter set forth.

The letter U indicates a pipe extending from the upper part of the tank down through the bottom, where it is bent, as indicated by the letter V, to form a trap, and then passed out at one side of the cabinet. This serves to discharge the water from the tank without admitting external air.

The tube E is set in the can by passing it down through a central aperture in the bottom of the can until the flange rests in a circular recess, W, in the said bottom. The leather or other elastic washers N are then placed on the tube and the lower end of the said tube is passed through the opening in the bottom of the tank, another washer being previously placed on the tube below the can. Then the jam-nut is screwed up firmly against the bottom of the tank, firmly securing the parts. The tube M is then passed through the tube E and the stuffing-box, and expanding the packing secured to the end of the washers, firmly binding the packing against the sides of the tube M and preventing any leakage of milk from the can.

The letter U indicates a tube extending down from the top of the tank through the bottom of the same, and bent so as to form a trap, and then carried out at one side, as shown in Fig. 2. This permits the escape of the water from the melting ice without admitting the external warm air to the ice-tank, thus economizing ice.

The operation of my invention is as follows: The cream, when it has collected on the surface of the milk in the cans, is skimmed off by lowering the tube M until its skimming-cup arrives at the level of the lower surface of the cream. The tube being exactly in the center of the can, the cream flows in from all quarters, and is carried out through the said tube into a receptacle below, which is placed in the refrigerator-chamber. To draw off the milk, the tube M is elevated until its end passes above the openings Y in the tube E, which allows the milk to flow out through the tube from the bottom of the can.

I am aware that the construction showing an ice-box surrounding or adjacent to the milk-cans and a chamber below the milk-cans is not new, and I make no claim, broadly, to such construction; neither do I claim a drip-tube that conveys the overflow of water away from the ice-chamber.

Having described my invention, I claim—

1. The combination of a milk-can having the externally-threaded tube E rising within its interior, and provided with a flange, F, which rests in a recess on the bottom of the can and retains the tube in place, with the elastic washers or packing-rings N N and P, the jam-nut H, and stuffing-box I, substantially as specified.

2. The combination of the tube E, provided with the flange F, to retain it within the milk-can, and the apertures Y Y, with the movable tube M, provided with the skimming-cup S, substantially as described.

In testimony that I claim the foregoing as my own I affix my signature in presence of two witnesses.

THOMAS S. VAN DEVORT.

Witnesses:
EDWARD P. ALLEN,
N. T. ATWOOD.